United States Patent [19]
Shiboh

[11] Patent Number: 5,531,043
[45] Date of Patent: Jul. 2, 1996

[54] POISONOUS BAIT CONTAINER FOR CRAWLING INSECTS

[75] Inventor: Yukio Shiboh, Tokyo, Japan

[73] Assignee: Hohto Shoji Co., Ltd., Japan

[21] Appl. No.: 175,935

[22] Filed: Dec. 30, 1993

[30] Foreign Application Priority Data

Apr. 8, 1993 [JP] Japan .................. 5-017670 U

[51] Int. Cl.⁶ .................................................. A01M 1/20
[52] U.S. Cl. .................................................. 43/131; 43/121
[58] Field of Search .................. 43/107, 114, 115, 43/131, 121, 132.1

[56] References Cited

U.S. PATENT DOCUMENTS

| | | | |
|---|---|---|---|
| 827,006 | 7/1906 | Gathmann | 43/114 |
| 1,112,064 | 9/1914 | Gordon | 43/114 |
| 1,221,785 | 4/1917 | Williams | 43/114 |
| 2,328,590 | 9/1943 | Weil | 43/131 |
| 3,304,646 | 2/1967 | Staley | 43/131 |
| 4,648,201 | 3/1987 | Sherman | 43/131 |
| 4,908,976 | 3/1990 | Dagenais | 43/115 |
| 5,042,194 | 8/1991 | Cohen | 43/107 |
| 5,119,586 | 6/1992 | Townsend | 43/121 |

FOREIGN PATENT DOCUMENTS 2166034  4/1986  United Kingdom ................ 43/114

Primary Examiner—Jack W. Lavinder
Assistant Examiner—James Miner
Attorney, Agent, or Firm—Marger, Johnson, McCollom & Stolowitz

[57] ABSTRACT

A poisonous bait container for crawling insects includes a container main body which has a tubular shape with a triangular cross-section and includes a bottom wall, a first side wall and a second side wall, the bottom wall and first side wall defining together a substantially right angle. An adhesion sheet is provided on the bottom wall and/or the first side wall, which includes an adhesive material and release paper.

12 Claims, 2 Drawing Sheets

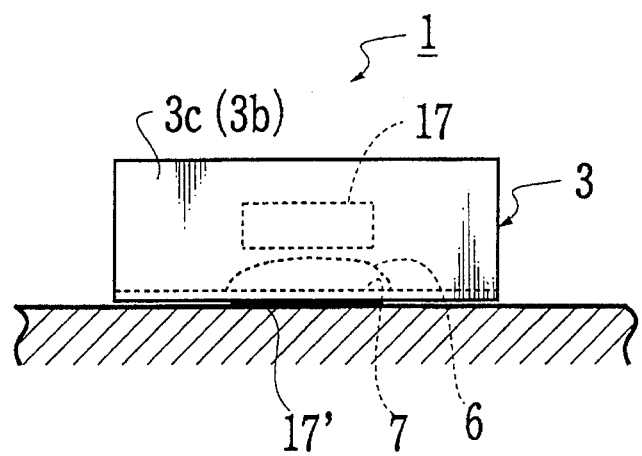
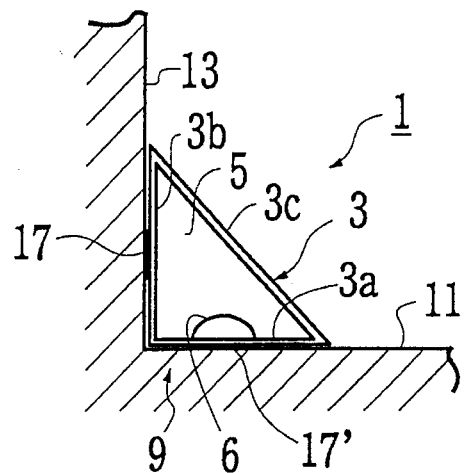
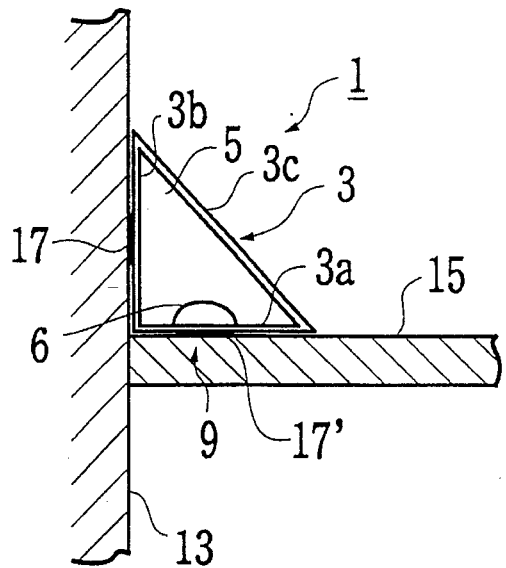

POISONOUS BAIT CONTAINER FOR CRAWLING INSECTS

BACKGROUND OF THE INVENTION

The present invention relates to a poisonous bait container for containing poisonous baits for killing crawling insects such as cockroaches or ants.

Japanese Utility Model Publication (Kokoku) No.(SHO) 64-772 discloses one of conventional poisonous bait containers for killing crawling insects. The poisonous bait container of this type includes a main body with a shape of small triangular pipe providing a narrow passage for inviting crawling insects. On the inner surface of the bottom portion of this main body a poisonous bait holding portion for holding a poisonous bait to kill crawling insects such as cockroaches or the like insects.

In the container main body, the bottom wall defines about 45 degrees with respect to the pair of side walls just adjacent this bottom wall. The outer surface of the bottom wall is constructed to be adhered to an appropriate place, e.g., a periphery of a room.

In the operation of such a conventional poisonous bait container, the main-body bottom wall is adhered to the horizontal floor or vertical wall at a periphery of a room. Therefore, this poisonous bait container can not be fixed closely to the periphery with its two side walls being directly in contact with the right-angled corner defined by the floor and wall.

Accordingly, the poisonous bait container of such a conventional type requires a relatively large space because of the necessity of adhering the largest wall, i.e., the bottom wall, to the floor or wall and degrades the outer appearance because of projecting its right-angled vertex portion defined by the two side walls from the floor or wall. Moreover, the insecticidal effect of this container to the crawling insects is relatively low because the insect-inviting passage can not be provided Just along the corner defined by the floor and wall.

SUMMARY OF THE INVENTION

It is an object of the present invention to provide a poisonous bait container for crawling insects which can be fixed closely to a right-angled corner of a room to enhance the insecticidal effect by conforming the container passage to the insect crawling route.

To achieve the above object, the present invention provides a poisonous bait container for crawling insects, comprising:

a container main body formed in a tubular shape with a right isosceles triangular cross-section and having a bottom wall, a first side wall and a second side wall and first and second opening at opposite ends thereof, the bottom wall defining about 45 degrees with respect to the first side wall the length of the container main body being 3 to 5 cm, the widths of the bottom wall and first side wall each being 1 to 2 cm, the wall thicknesses of the bottom wall, first side wall and second side wall each being 0.2 to 0.6 mm, and the container main body being made of a thermoplastic resin; and an adhesion sheet provided on at least one of the bottom wall and the first side wall and including an adhesive and a release paper.

In the construction of this invention, the outer surfaces of the bottom and first walls are directly in contact with the horizontal and vertical faces at a right-angled corner of a room respectively after removing the release paper from the adhesion sheet. In that manner, the container can be fixed with its main body being attached closely to the right-angled corner. Alternatively, the outer surfaces of the bottom and first walls may be attached to the vertical and horizontal faces at a right-angled corner of a room, respectively.

These and other objects, features and advantages of the present invention will be more apparent from the following description of a preferred embodiment, taken in conjunction with the accompanying drawings.

BRIEF DESCRIPTION OF THE DRAWING

FIG.3 is a front view of the embodiment of FIG.1.

FIG.4 is a side view of the embodiment of FIG.1 showing a state in which this embodiment is placed at a corner position of a room.

FIG.5 is a side view of the embodiment of FIG.1 showing a state in which this embodiment is placed at a corner position on a shelf provided in a room.

DESCRIPTION OF THE PREFERRED EMBODIMENT

Figure 1:
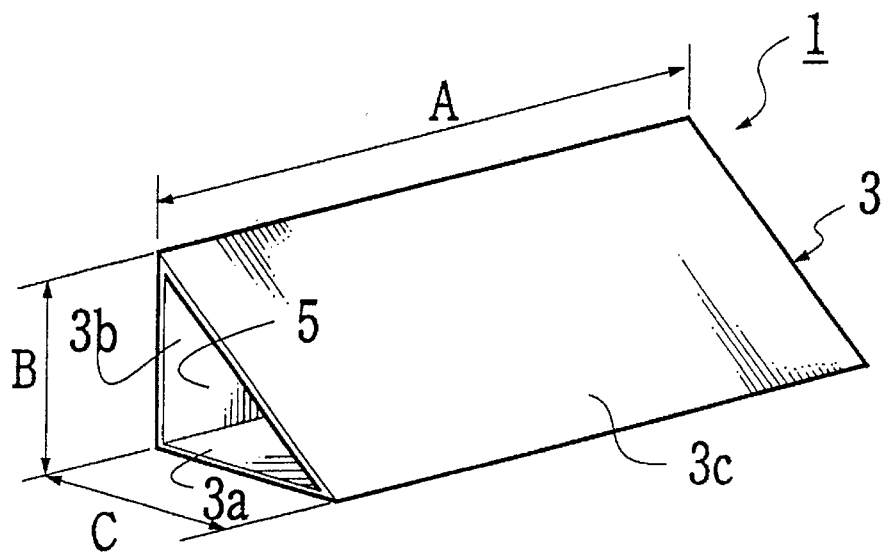
FIG.1 is a perspective view showing an embodiment of the poisonous bait container for crawling insects according to the present invention.
Figure 2:
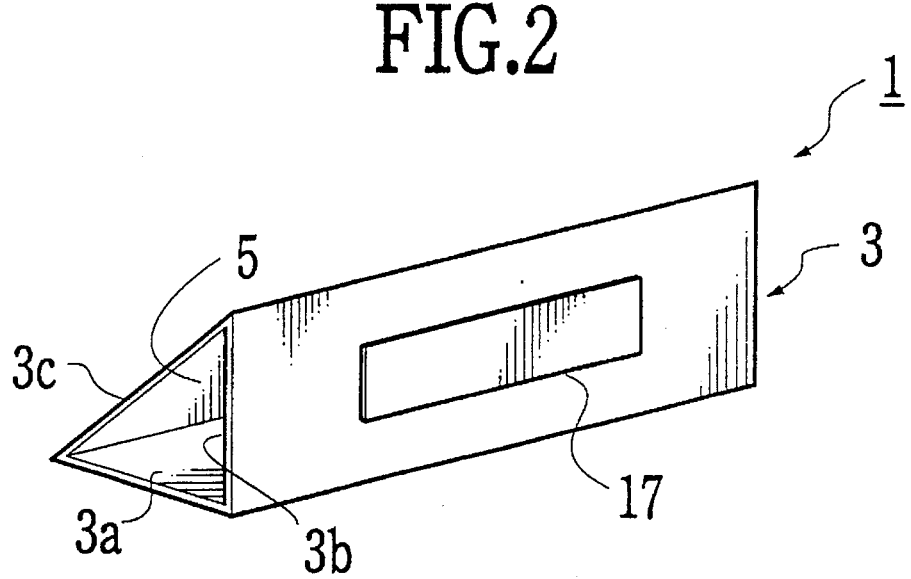
FIG.2 is a perspective view showing the embodiment of FIG.1 seen in a different direction from that of FIG.1.

Referring to FIGS. 1 to 3, the poisonous bait container 1 for crawling insects includes a main body 3 having a shape of triangular pipe providing a narrow passage 5 for inviting crawling insects such as cockroaches or ants. The main body 3 comprises a bottom portion 3a and a pair of side portions 3b, 3c provided on both sides of the bottom portion 3a, all of these portions consisting of a semitransparent resin material. In the central portion of the inner surface of bottom portion 3a is formed a bait placing portion 7 where a paste or gel of bait 6 for killing crawling insects is placed.

As clearly shown in FIGS. 1 and 2, the main body includes a substantially right-angled portion defined by the bottom portion 3a and side portion 3b. Therefore, as shown in FIG.4, this main body 3 can be placed at a corner 9 of a room with its bottom portion 3a and side portion 3b contacting closely with a horizontal floor 11 and a vertical wall 13 defining the corner portion 9. Alternatively, as shown in FIG. 5, this main body 3 can be also fitted at another corner portion 9 defined by a horizontal upper surface 15 of a shelf and a vertical wall 13.

To fix the main body 3 with ease at the corner portion 9 in such a close contact state, an adhesion sheet 17 is provided on the outer surface of side portion 3b by coating an adhesive thereon and covering it with release paper. In this case, the adhesion sheet 17 (or 17') may be provided on the outer surface of bottom portion 3a or on both outer surfaces of bottom and side surfaces 3a and 3b.

In FIG.1, the main body 3 has a length of 3 to 5 cm, preferably 4 cm, and each of the width B, C of bottom and side portions 3a, 3b is 1 to 2 cm, preferably 1.5 cm. Additionally, the wall thickness of main body 3 is 0.2 to 0.6 mm, preferably 0.4 mm. That is, the main body 3 has preferably an isosceles-triangular cross-section.

The main body consists of a thermoplastic resin, such as polypropylene, polyethylene and polystyrene.

Instead of semitransparent state, the main body 3 may have a color, for example, silver, white and brown.

As the poisonous bait, there can be mentioned bait materials including hydramethylnone, and MAXFORCE (trademark) is the most preferable. The bait 6 is placed at the central portion of bait placing portion 7 in an amount of 0.25 to 0.5 g.

Next, the operation of this embodiment will be described based on the construction mentioned above.

After the release paper is removed from adhesion sheet 17, the outer surface of bottom portion 3a in the container main body 3 is pressed onto the floor 11 (or the surface of shelf 15) at the right-angled corner portion 9 of a room, while the outer surface of side portion 3b is pushed toward the wall 13 at the corner 9. In that manner, the main body 3 can be fixed closely at the right-angled corner 9. In this case, the container main body 3 may be also fixed at the corner portion 9 by contacting the outer surface of its bottom portion 3a with the wall 13 at the corner 9, while pressing the outer surface of side portion 3b onto the floor 11 (or the surface of shelf 15) at the corner 9.

After the container main body 3 is fixed at the corner portion 9 of a room, the poisonous bait 6 for killing crawling insects is placed at the bait placing portion 7. Leaving the poisonous bait container 1 for a while in that state, crawling insects such as cockroaches or ants come and enter the passage 5 to eat the poisonous bait 6. Then, these insects having eaten the poisonous bait 6 will die outside the container main body 3. The bait 6 may be provided at the bait placing portion 7 either after or before setting the container main body 3 at the corner 9.

According to this embodiment, the container main body 3 with a small triangular pipe-like shape includes the adhesive right-angled portion defined by the bottom portion 3a and the side portion 3b. Therefore, the main body 3 can be fixed closely to the right-angled corner portion 9 of a room as shown in FIGS. 4 and 5. Thus, the poisonous bait container 1 for crawling insects can be used with good efficiency of space without degrading the interior appearance. In addition, since the poisonous bait container 1 can be fitted closely to the right-angled corner portion 9, it can prevent such insects from crawling aside the passage 5 of container main body 3a. Therefore, the insecticidal effect to such crawling insects can be highly enhanced.

Moreover, the container main body 3 can be easily fixed to and removed from the corner portion 9 of a room by providing the adhesion sheet 17 on the outer surface of side portion 3b in the container main body 3.

Since the inside of container main body 3 can be observed by constructing the main body 3 with a semitransparent resin material, the poisonous bait 6 can be supplied if it decreases or runs out. Therefore, the insecticidal effect can be increased so much.

Additionally, the narrow passage 5 of container main body 3 is suitable to a peculiar character of cockroaches (a kind of crawling insects) liking a narrow place.

Since the container main body 3 has the outer dimensions as stated above, it can prevent children from putting their fingers in the main body to touch the poisonous bait placed therein. Further, the triangular shape of container main body 3 serves for preventing small animals, such as cats and dogs being kept as pet, from swallowing the container.

Various modifications will become possible for those skilled in the art after receiving the teachings of the present disclosure without departing from the scope thereof.

What is claimed is:

1. A poisonous bait container for crawling insects comprising:

a body consisting of first, second and third walls connected together to form a tubular body having a triangular cross-sectional shape, the first and second walls being in substantially perpendicular relation one to the other, and each having a width not greater than 2 centimeters;

adhesive means on an exterior surface of said first wall; and insect control means disposed within said body.

2. A poisonous bait container according to claim 1 wherein the length of the body is 4 cm, the width of the first and second walls is 1.5 cm, and the thickness of the first, second and third walls is 0.4mm.

3. A poisonous bait container according to claim 1 wherein the body consists of polypropylene, polyethylene or polystyrene.

4. A poisonous bait container according to claim 1 wherein the body is semitransparent.

5. A poisonous bait container for crawling insects according to claim 1 wherein the adhesive means comprises an adhesive strip having first and second opposed adherent surfaces, the first adherent surface adhered to the exterior surface of said wall.

6. A poisonous bait container for crawling insects according to claim 5 wherein the adhesive means further comprises a release strip removably adhered to the second adherent surface of the adhesive strip.

7. A poisonous bait container for crawling insects according to claim 1 wherein the insect control means comprises an insect poison.

8. A poisonous bait container for crawling insects according to claim 7 wherein the insect poison comprises hydramethylnone.

9. A poisonous bait container for crawling insects according to claim 1 wherein the insect control means comprises an insect-immobilizing material.

10. A poisonous bait container according to claim 1 wherein the cross-sectional shape of the body comprises a right isosceles triangle.

11. A poisonous bait container for crawling insects comprising:

a body consisting of first, second and third walls connected together to form a tubular body having a triangular cross-section, the first and second walls being in substantially perpendicular relation one to the other, the first and second walls each having a width of not greater than 2 centimeters;

an adhesive strip having first and second opposed adherent surfaces, the adhesive strip adhered by a first adherent surface to an exterior surface of said first wall, and a release sheet covering the adhesive strip second adherent surface; and an insect poison disposed within said body.

12. A poisonous bait container for crawling insects according to claim 11 wherein the insect poison comprises hydramethylnone.

* * * * *